US00RE46268E

(19) United States
(12) Reissued Patent
Walter

(10) Patent Number: US RE46,268 E
(45) Date of Reissued Patent: Jan. 10, 2017

(54) SHOPPING CART

(71) Applicant: AMSA, Inc., Boulder, CO (US)

(72) Inventor: Ivor Michel Walter, Boulder, CO (US)

(73) Assignee: AMSA, Inc., Boulder, CO (US)

(21) Appl. No.: 29/532,683

(22) Filed: Jul. 9, 2015

Related U.S. Patent Documents

Reissue of:
(64) Patent No.: Des. 685,972
Issued: Jul. 9, 2013
Appl. No.: 29/417,407
Filed: Apr. 3, 2012

(51) LOC (10) Cl. ..... 12-02
(52) U.S. Cl.
USPC ..... D34/21
(58) Field of Classification Search
USPC ..... D34/12, 13, 14, 20, 21
CPC ..... B62B 3/14; B62B 3/182; B62B 3/1476; B62B 3/1468
See application file for complete search history.

(56) References Cited

U.S. PATENT DOCUMENTS

| | | | |
|---|---|---|---|
| 2,958,537 | A | 11/1960 | Young |
| 3,039,564 | A | 6/1962 | Shaukis |
| 3,645,554 | A | 2/1972 | Von Stein et al. |
| 4,560,180 | A | 12/1985 | Ulmer |
| 4,726,596 | A | 2/1988 | Ulmer |
| 5,211,410 | A | 5/1993 | Trubiano |

(Continued)

OTHER PUBLICATIONS

Peggs KNM075GT Scan of website [http://www.thepeggscompany.com/shopping_carts/large view/2_tier.html] dated Mar. 14, 2009 showing prior art cart manufactured by Peggs.

(Continued)

*Primary Examiner* — Phillip S Hyder
(74) *Attorney, Agent, or Firm* — Polson Intellectual Property Law, PC; Margaret Polson

(57) CLAIM

The ornamental design for a *shopping* cart, as shown and described.

DESCRIPTION

FIG. 1 is a rear perspective view of my new design [of] *for* a *shopping* cart showing my claimed design;
FIG. 2 is a side elevation view of the right and left sides, which are mirror images, of FIG. 1[.] *;*
FIG. 3 is a front side elevation view of FIG. 1[.]*;*
FIG. 4 is a [back] *rear* side elevation view of FIG. 1[.] *;*
FIG. 5 is a top plan view of FIG. 1; and,
FIG. 6 is a bottom plan view of FIG. 1.
The broken [line showing of wheels and bumpers is included for the purpose of illustrating portions of the article and forms] *lines shown in the drawings illustrate portions of the shopping cart that form* no part of the claimed design.

1 Claim, 5 Drawing Sheets

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D348,549 | S | | 7/1994 | Trubiano | |
| 5,348,323 | A | | 9/1994 | Trubiano | |
| 5,435,582 | A | | 7/1995 | Davidson | |
| D367,348 | S | | 2/1996 | Basharat | |
| 5,505,472 | A | | 4/1996 | Trubiano | |
| 5,507,507 | A | | 4/1996 | Davidson | |
| 5,553,876 | A | | 9/1996 | Trubiano | |
| 5,702,114 | A | | 12/1997 | Downing et al. | |
| 5,961,133 | A | | 10/1999 | Perry | |
| 6,126,181 | A | | 10/2000 | Ondrasik | |
| D463,647 | S | | 9/2002 | Deal et al. | |
| D472,026 | S | | 3/2003 | Walter | |
| D472,027 | S | | 3/2003 | Walter | |
| 6,644,674 | B2 | | 11/2003 | Simard | |
| D493,594 | S | | 7/2004 | Prather et al. | |
| 6,932,363 | B2 | | 8/2005 | D'Angelo | |
| D538,501 | S | | 3/2007 | Walter | |
| D550,423 | S | | 9/2007 | Splain et al. | |
| D564,172 | S | * | 3/2008 | Steinhobel | D34/12 |
| D566,372 | S | | 4/2008 | Walter | |
| D580,619 | S | | 11/2008 | Walter | |
| D583,523 | S | | 12/2008 | Deal et al. | |
| D584,023 | S | | 12/2008 | Walter | |
| D605,823 | S | | 12/2009 | Walter | |
| D606,723 | S | | 12/2009 | Walter | |
| D607,173 | S | | 12/2009 | Selvig et al. | |
| D633,269 | S | | 2/2011 | Walter | |
| D638,602 | S | | 5/2011 | Walter | |
| D639,521 | S | | 6/2011 | Walter | |
| D644,393 | S | | 8/2011 | Walter | |
| D644,809 | S | | 9/2011 | Walter | |
| D645,222 | S | * | 9/2011 | Walter | D34/21 |
| D645,631 | S | * | 9/2011 | Walter | D34/21 |
| D648,915 | S | | 11/2011 | Walter | |
| D656,288 | S | * | 3/2012 | Walter | D34/27 |
| D658,841 | S | | 5/2012 | Walter | |
| D665,552 | S | | 8/2012 | Walter | |
| D672,111 | S | * | 12/2012 | Walter | D34/21 |
| D677,033 | S | * | 2/2013 | Walter | D34/21 |
| 2001/0022436 | A1 | | 9/2001 | Simard | |
| 2003/0151219 | A1 | | 8/2003 | Simard | |

OTHER PUBLICATIONS

Technibilt 5141-D Scan of website [http://www.technibilt.com/carts/detail.php?id=36] dated Feb. 25, 2011 showing prior art cart manufactured by Techibilt.

Technibilt 5341 Scan of website [http://www.technibilt.com/carts/detail.php?id=30] dated 2009 showing prior art cart manufactured by Techibilt.

Technibilt 5640 Scan of website [http://www.technibilt.com/carts/detail.php?id=28] dated 2009 showing prior art cart manufactured by Techibilt.

U.S. Appl. No. 29/410,149, filed Jan. 4, 2012; Inventor: Ivor Michel Walter.

* cited by examiner

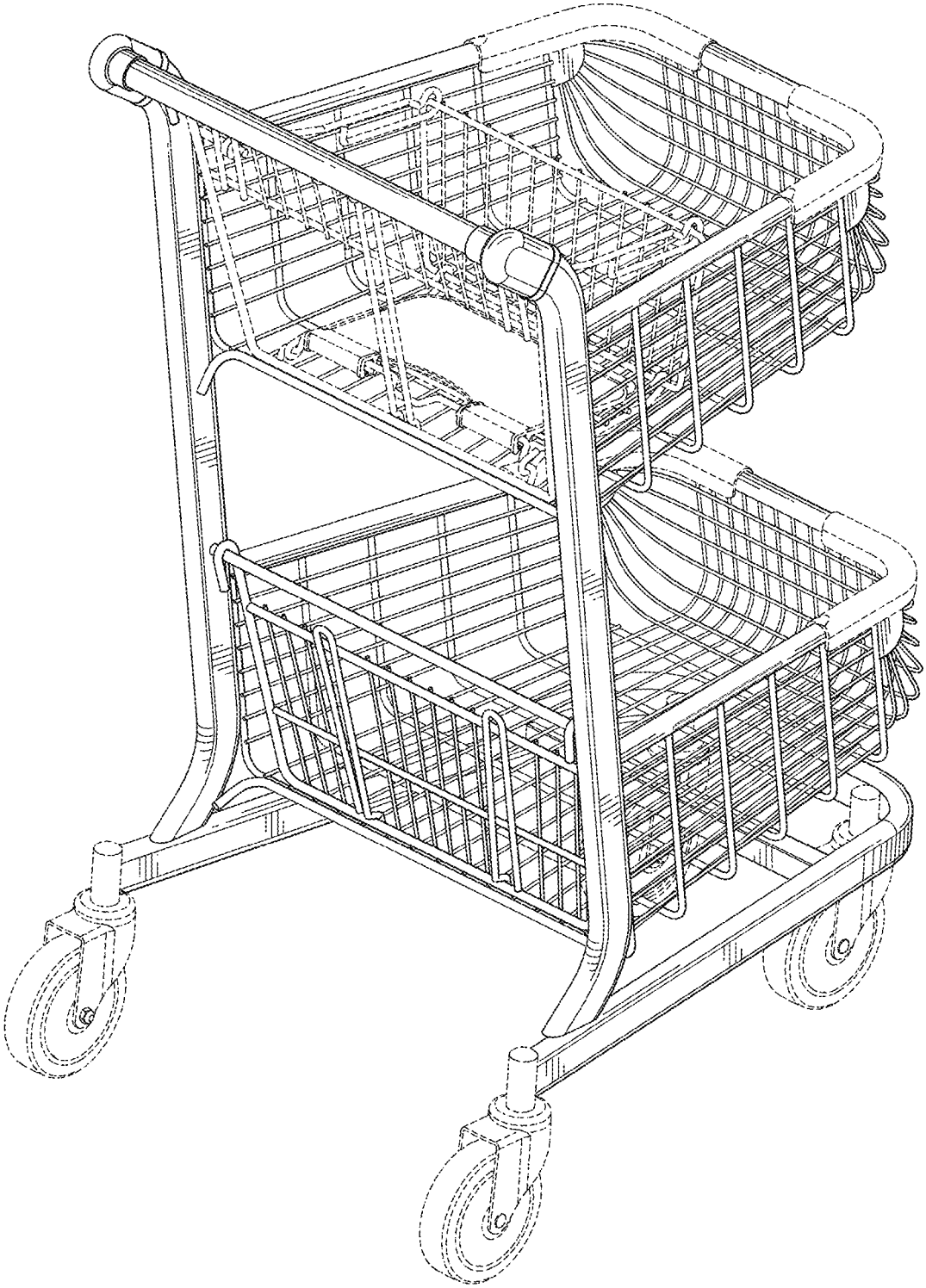
FIG.1 (AMENDED)

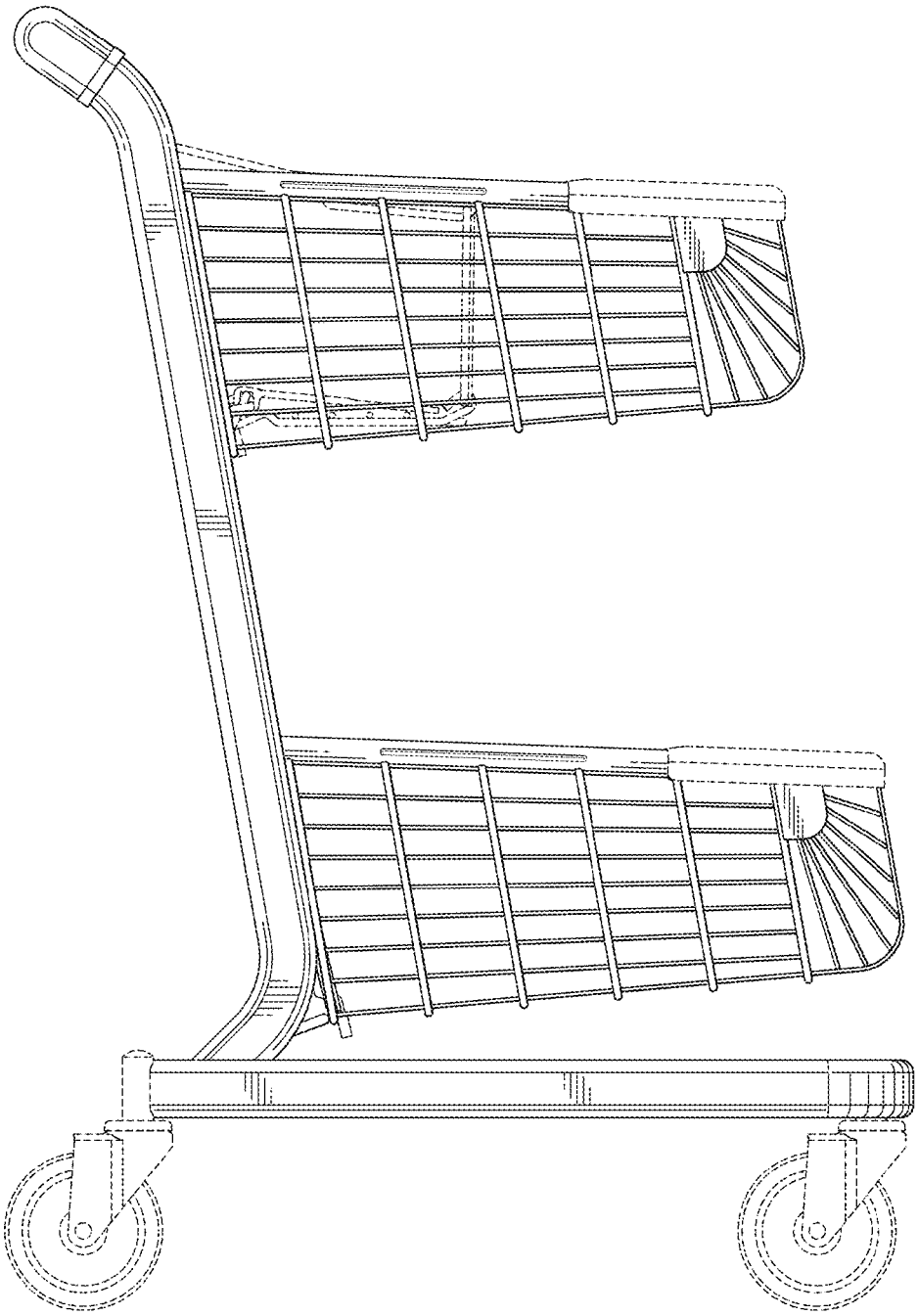
FIG.2 (AMENDED)

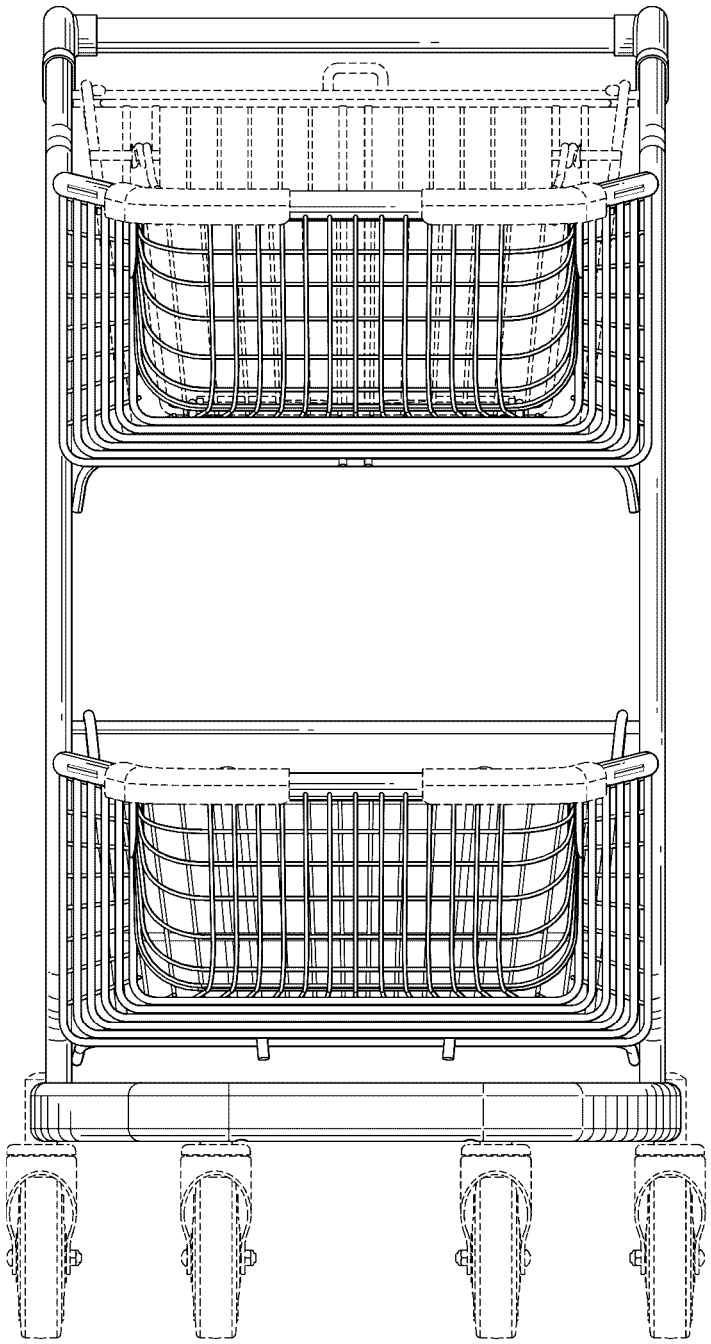
FIG.3 (AMENDED)

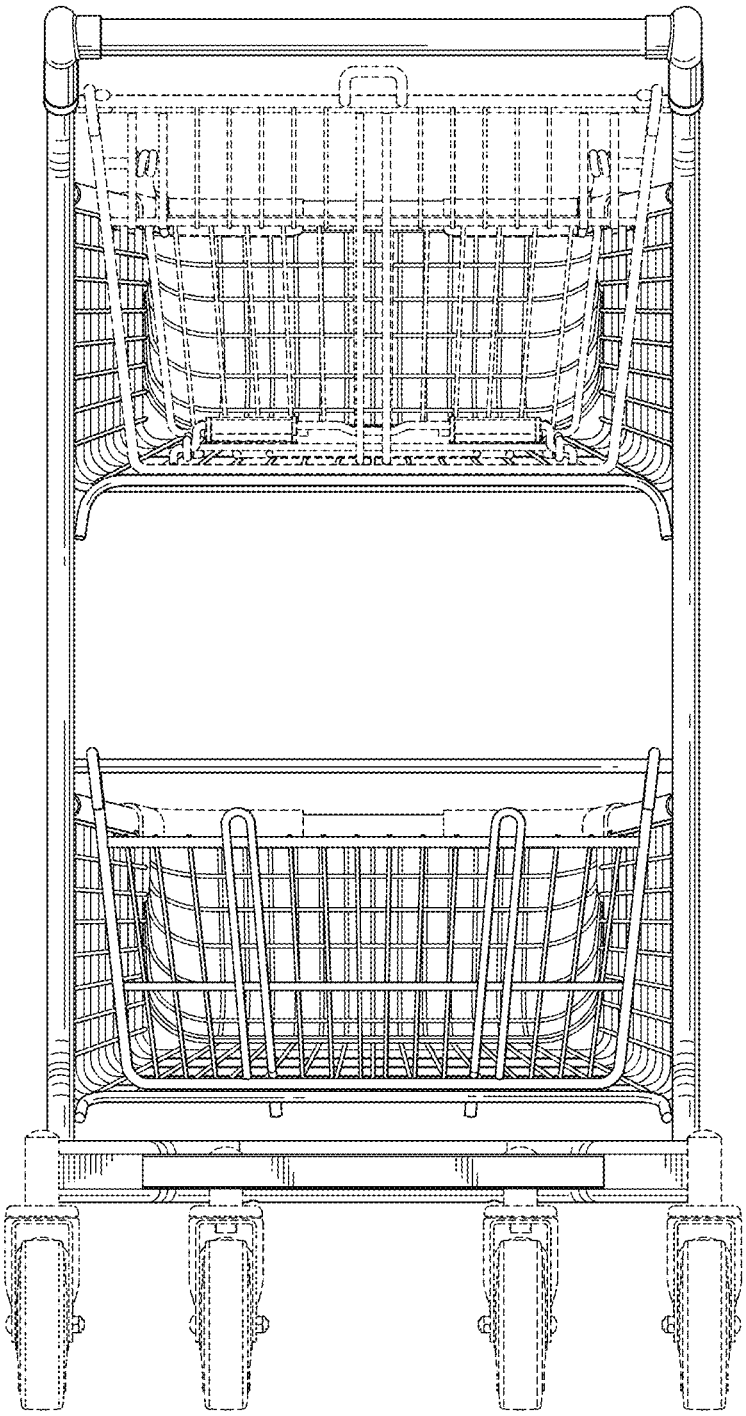
FIG.4 (AMENDED)

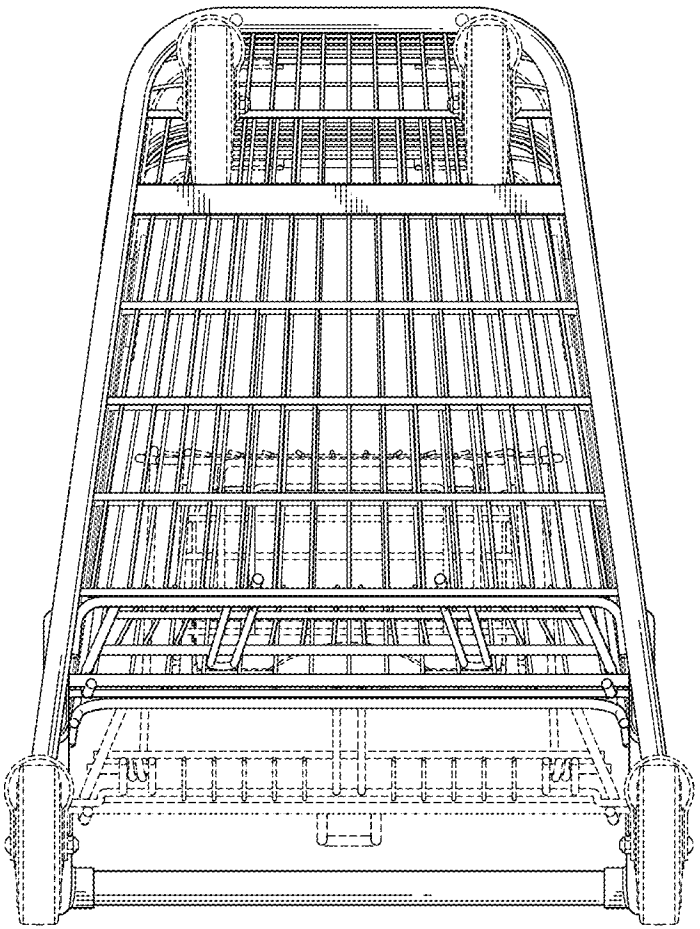
FIG.6 (AMENDED)
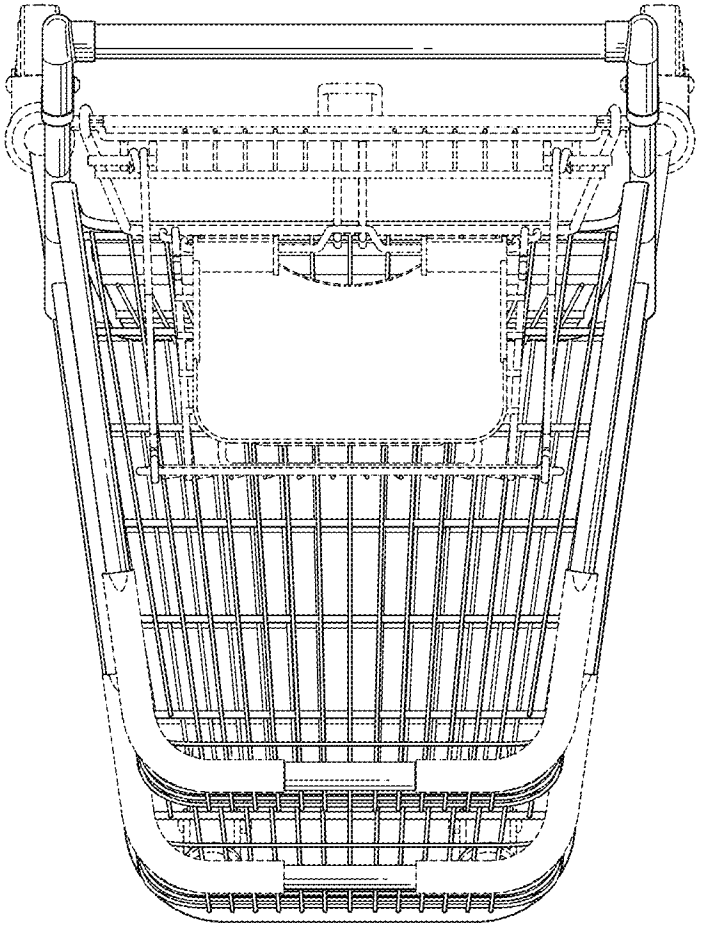
FIG.5 (AMENDED)